(12) United States Patent
Savir et al.

(10) Patent No.: US 11,126,531 B2
(45) Date of Patent: Sep. 21, 2021

(54) REAL-TIME VIEWING TOOL FOR COMPRESSED LOG DATA

(71) Applicant: EMC IP Holding Company LLC, Hopkinton, MA (US)

(72) Inventors: Amihai Savir, Sansana (IL); Omer Sagi, Mazkeret Batya (IL); Oshry Ben-Harush, Kibutz Galon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 16/023,113

(22) Filed: Jun. 29, 2018

(65) Prior Publication Data
US 2020/0004658 A1 Jan. 2, 2020

(51) Int. Cl.
*G06F 11/34* (2006.01)
*G06F 16/901* (2019.01)
*G06F 16/904* (2019.01)
*G06F 16/903* (2019.01)

(52) U.S. Cl.
CPC ........ *G06F 11/3476* (2013.01); *G06F 16/901* (2019.01); *G06F 16/904* (2019.01); *G06F 16/90344* (2019.01)

(58) Field of Classification Search
CPC ............. G06F 11/3476; G06F 16/9535; G06F 16/50; G06F 17/40; G06F 16/901; G06F 16/904; G06F 16/90344; H04N 2201/3278
See application file for complete search history.

(56) References Cited

U.S. PATENT DOCUMENTS

| 9,619,478 | B1* | 4/2017 | Singh | G06F 17/40 |
| 2014/0317137 | A1* | 10/2014 | Hanaoka | G06F 17/40 707/758 |
| 2015/0095650 | A1* | 4/2015 | Nemiroff | H04L 9/3263 713/175 |
| 2016/0004618 | A1* | 1/2016 | Chambliss | G06F 11/3452 702/179 |
| 2016/0197621 | A1* | 7/2016 | Hong | H03M 7/3088 715/236 |

OTHER PUBLICATIONS

U.S. Appl. No. 15/940,247 entitled "Real-Time Compression of Log Data", filed Mar. 28, 2018.

* cited by examiner

*Primary Examiner* — Jigar P Patel
(74) *Attorney, Agent, or Firm* — Ryan, Mason & Lewis, LLP (57) ABSTRACT

Techniques are provided for decompression of compressed log data, such as for a real-time viewing of compressed log data. An exemplary method comprises: obtaining a compressed log file comprised of a plurality of compressed log messages, wherein a given compressed log message is comprised of one or more message variables and a message signature corresponding to a message template of the given compressed log message; and presenting a first subset of the compressed log file by translating, in memory, the message signatures of the compressed log messages within the first subset to corresponding message templates using a decompression index that maps a plurality of the message signatures to corresponding message templates. The first subset of the compressed log file may comprise a predefined number of lines surrounding a requested line of the compressed log file. In further variations, at least one additional subset of the compressed log file is precomputed using the disclosed decompression techniques.

20 Claims, 10 Drawing Sheets

REAL-TIME DISPLAY
ILLUSTRATION 600

COMPRESSED LOG DATA ON DISK 610

...

38 1 ronite,10.12.\*\*.19

39 3 parusa,callers,10.12.++.25

40 6 parusa,hariush,zabbix 41 4 10.12.44.12,10.12.##.15

...

88 6 remaesg,parusa,slf 89 6 herman,savira,slf 91 2 savira,10.2.%%.15

92 5 10.12.^^.12,zabbix,remaesg

...

640

DECOMPRESSED LOG DATA 620 FOR PRESENTATION ON VIEWER SCREEN

...

1518614624771 username ronite connected now into 10.12.\*\*.19 the user is trying to enter password 3 times 1518614624772 user parusa is browsing into callers from ip address 10.12.++.25 last activity was done 11 days ago 1518614624773 the following users failed to run authentication process (parusa,hariush) please contact your zabbix administrator for solving this issue as soon as possible - ticket had been created, email sent to the user as well 1518614624774 application server 10.12.44.12 is now connected to 10.12.##.15 for more than 60 minutes.

...

1518614624821 the following users failed to run authentication process (remaesg,parusa) please contact your slf administrator for solving this issue as soon as possible - ticket had been created, email sent to the user as well 1518614624822 the following users failed to run authentication process (herman,savira) please contact your slf administrator for solving this issue as soon as possible - ticket had been created, email sent to the user as well 1518614624824 user savira disconnected now from 10.2.%%.15 the user run the application for 60 minutes 1518614624825 back-end server 10.12.^^.12 is logging into zabbix authentication is running against user remaesgthe user successfully authenticated

COMPRESSION INDEX 700

| TEMPLATE (KEY) | SIGNATURE |
|---|---|
| "text-1,1 %d text-2,1 %s, text-3,1 %..., text-n" | 01x |
| "text-1 %d text-2 %s, text-3 %..., text-n" | 02x |
| "text-1,3 %d text-2,3 %s, text-3,3 %..., text-n" | 03x |
| "text-1,k %d text-2,k %s, text-3,k %..., text-n" | FAx |

FIG. 7

DECOMPRESSION (REVERSE) INDEX 800

| SIGNATURE (KEY) | TEMPLATE |
|---|---|
| 01x | "text-1,1 %d text-2,1 %s, text-3,1 %..., text-n" |
| 02x | "text-1 %d text-2 %s, text-3 %..., text-n" |
| 03x | "text-1,3 %d text-2,3 %s, text-3,3 %..., text-n" |
| FAx | "text-1,k %d text-2,k %s, text-3,k %..., text-n" |

REAL-TIME VIEWING TOOL FOR COMPRESSED LOG DATA

FIELD

The field relates generally to the processing of log messages.

BACKGROUND

Traditional log file systems typically store all of the log data generated by a monitored system, such as software and/or hardware applications. Log files often contain uninformative information that reappears in multiple log messages due to redundant text that a given log message template contains. Such uninformative information is stored in the log file system, consuming storage resources and causing challenges for data analysis tasks. U.S. patent application Ser. No. 15/940,247, filed Mar. 29, 2018, now U.S. Pat. No. 11,023,420, entitled "Real-Time Compression of Log Data," provides compression techniques for reducing log file system size and for easing log data analysis tasks.

A need remains for improved techniques for decompression of compressed log messages.

SUMMARY

Illustrative embodiments of the present disclosure provide for decompression of compressed log data, such as for a real-time viewing of the compressed log data. In one embodiment, an exemplary method comprises: obtaining a compressed log file comprised of a plurality of compressed log messages, wherein a given compressed log message is comprised of one or more message variables and a message signature corresponding to a message template of the given compressed log message; and presenting a first subset of the compressed log file by translating, in memory, the message signatures of the compressed log messages within said first subset to corresponding message templates to decompress the first subset of the compressed log file using a decompression index that maps a plurality of the message signatures to corresponding message templates.

In some embodiments, the first subset of the compressed log file comprises a predefined number of lines surrounding a requested line of the compressed log file. In further variations, at least one additional subset of the compressed log file is precomputed by translating, in memory, the message signatures of the compressed log messages within the at least one additional subset to corresponding message templates using the decompression index, wherein the at least one additional subset comprises a predefined subset of the compressed log file before and/or after the presented first subset. The at least one additional subset of the compressed log file comprises, for example, a predefined number of points within the compressed log file, wherein a user can skip a view of the compressed log file to one of the predefined number of points.

Other illustrative embodiments include, without limitation, apparatus, systems, methods and computer program products comprising processor-readable storage media.

BRIEF DESCRIPTION OF THE DRAWINGS

FIG. 6 illustrates a presentation of decompressed portions of compressed log data, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide for decompression of compressed log data, such as for a real-time viewing of the compressed log data.

Traditional log file systems typically store the entire log message generated by the monitored software and/or hardware applications regardless of the constant, repetitive text that may be in the log messages. U.S. patent application Ser. No. 15/940,247, filed Mar. 29, 2018, now U.S. Pat. No. 11,023,420, entitled "Real-Time Compression of Log Data," incorporated by reference herein in its entirety, provides for compression and decompression of log data, such as a real-time compression and decompression of log data. In one or more embodiments, log messages are compressed by storing portions of log messages that reappear in other log messages only once and representing the reappearing portions (referred to herein as a message template) using a short sequence of characters (referred to herein as a signature). In some embodiments, the length of the sequence is determined by a number of occurrences of the given text. Generally, in some embodiments, a given message signature is assigned to a particular message template based on a length of the given message signature and a frequency of occurrence of the particular message template (e.g., the more frequent the occurrences, the shorter the sequence length of the signature). The disclosed log message reduction techniques significantly reduce the size of the log files and simplify log analysis tasks in a fully automated manner.

One or more embodiments of the present disclosure decompress a compressed log file comprised of a plurality of compressed log messages. A given compressed log message is comprised of one or more message variables and a message signature corresponding to a message template of the given compressed log message. In some embodiments, a first subset of the compressed log file is presented to a user by translating, in memory, the message signatures of the compressed log messages within the first subset to corresponding message templates using a decompression index that maps a plurality of the message signatures to corresponding message templates.

In this manner, a user can view, in a decompressed format, a portion of the compressed log file that is currently on the screen (and the remainder of the log file can still be compressed in some embodiments). The disclosed viewer tool will support smooth navigation, such as scrolling over, or skipping directly into, a specific portion of the file, as discussed further below. In one or more embodiments, a predefined number of screens (e.g., 100 screens) can be calculated in advance, across the compressed log file, that will enable the viewer tool to estimate according to the navigation bar the rows that should be decompressed for presentation on the display screen.

In at least one embodiment, a user can consume and view compressed log information without extracting all of the log information to the disk (e.g., the user will view the data as it is written in a plain text format and the size of the file will not change). In one or more embodiments, statistical measures and a lazy viewer approach are employed. For example, only the information that will be presented on the screen is extracted (in memory) in some embodiments.

In one or more embodiments, lazy evaluation techniques are applied to log data viewers to enable reading and searching compressed log data without extracting the compression. In this manner, disk space is reduced across the entire life-time of the log data. The disclosed techniques for decompression of compressed log data can split the data across clusters. All of the data does not need to be extracted at the same time. Thus, the disclosed approach can be used to display large files to the user.

Compressed log data typically cannot be viewed in a compressed format. An analysis of the log data often requires the extraction of the entire compressed file into a hard drive. As a result, both the compressed version and the uncompressed version are stored in the hard drive. This approach may end up with an increased usage of storage resources, rather than a usage reduction, given that exploration tasks are conducted very frequently.

Event logs are often stored by default in a plain text format on one or more local or remote servers. There are different solutions available that enable users to store log data, usually priced according to the total required data size, data writes per day and/or guaranteed response time for searches. A substantial amount of recurring text sequences increases the consumption of storage resources and therefore, increases the storage costs for log data owners. This problem becomes even more challenging when a regulation or law is in place and the companies have challenges storing data for a long history.

Existing compression methods have a number of disadvantages. First, the compression is typically performed offline (e.g., new log records cannot be written into the compressed file). Compression can be performed on a closed file which is typically considered an archive. In addition, these known compression methods are generic and the compression rate that can be achieved is limited to the entropy that is exhibited by the sequence of letters in the document. Log data inherently contains a structure and patterns that can be more compactly represented once that structure is identified and known. Further, reviewing a zip file, for example, is slower than reviewing a text file and the zip file must be extracted to a storage device in order to allow a search or any other interaction with the stored data.

Figure 1:
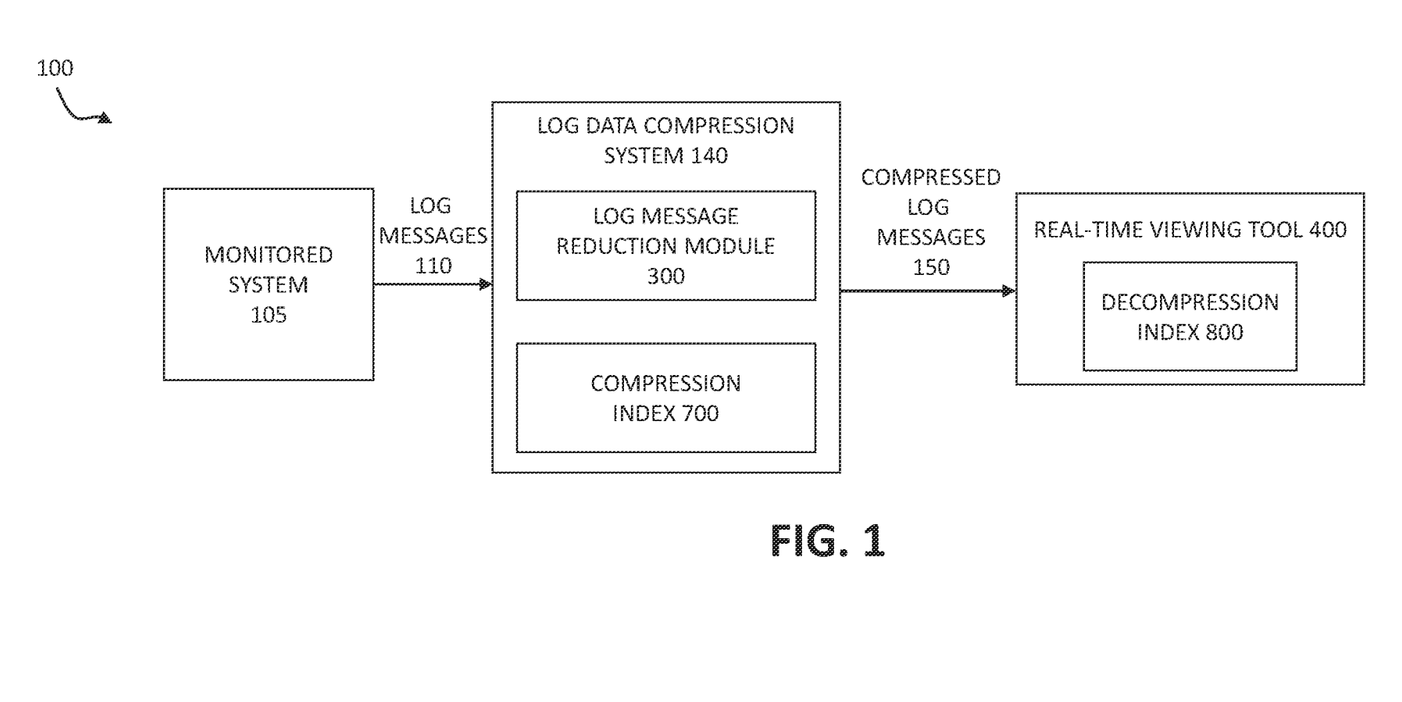
FIG. 1 illustrates an exemplary log data compression and decompression system, according to an embodiment of the disclosure.

FIG. 1 illustrates an exemplary log data compression and decompression system, according to an embodiment of the disclosure. As shown in FIG. 1, an exemplary log data compression and decompression system 100 comprises a log data compression system 140 that processes log messages 110 from a monitored system 105, such as a software and/or hardware application, and generates a set of compressed log messages 150. Generally, log messages are compressed by storing message template portions of log messages that reappear in other log messages only once and representing the message template using a short signature sequence of characters, as discussed further below in conjunction with FIG. 2.

As shown in FIG. 1, the exemplary log data compression system 140 comprises a log message reduction module 300, as discussed further below in conjunction with FIG. 3, and a compression index 700, as discussed further below in conjunction with FIG. 7. In addition, a real-time viewing tool 400, as discussed further below in conjunction with FIG. 4, presents a portion of the compressed log file by translating, in memory, the message signatures of the compressed log messages within the portion to corresponding message templates using a decompression index 800, as discussed further below in conjunction with FIG. 8, that maps a plurality of message signatures to corresponding message templates.

Figure 2:
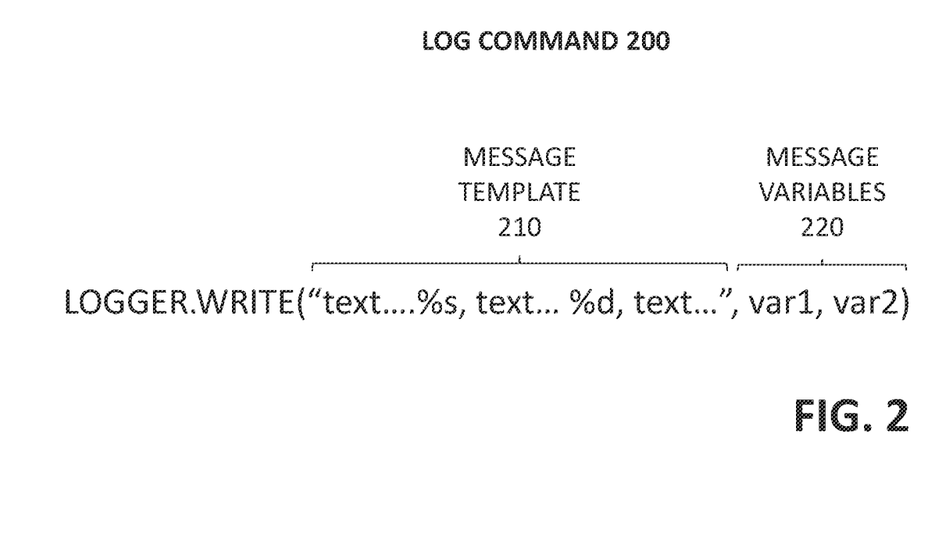
FIG. 2 provides an example of a log command, according to some embodiments.

FIG. 2 provides an example of a log command 200, according to some embodiments. As shown in FIG. 2, the exemplary log command 200 comprises a message template 210 of "text . . . % s, text . . . % d, text . . . " and one or more message variables 220 "var1, var2". Generally, portions of the message template 210 are replaced with the message variables 220, in a known manner. For example, the characters "% d" in the message template 210 (between constant text "text-1" and "text-2") are replaced by the first message variable 220 ("var1").

Figure 3:
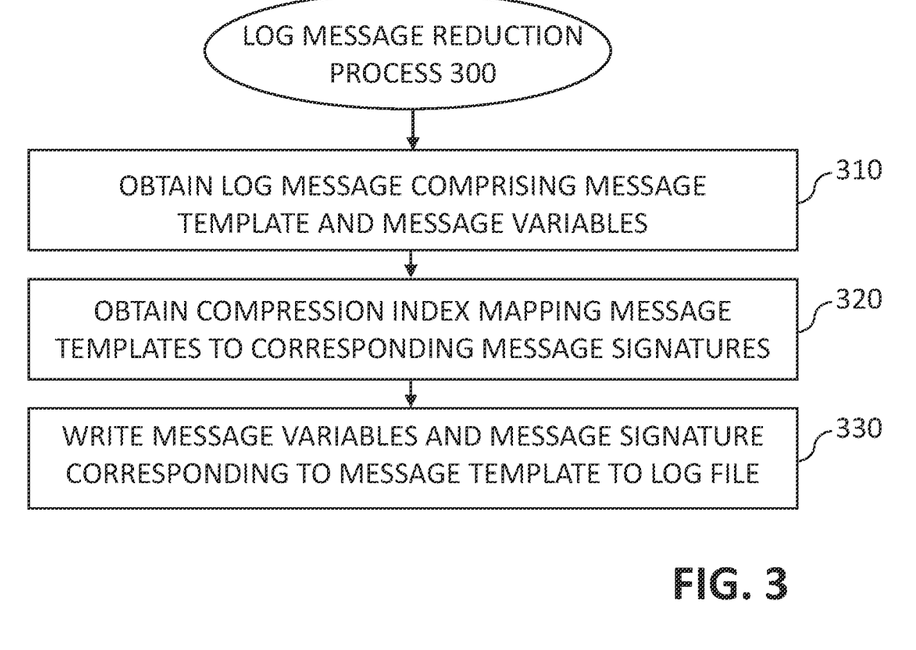
FIG. 3 is a flow chart illustrating a log message reduction process, according to an embodiment.

FIG. 3 is a flow chart illustrating a log message reduction process 300, according to an embodiment of the disclosure. As shown in FIG. 3, the exemplary log message reduction process 300 initially obtains a log message during step 310 comprising a message template and one or more message variables. In addition, the exemplary log message reduction process 300 obtains a compression index 700 during step 320 that maps message templates to corresponding message signatures, as discussed further below in conjunction with FIG. 7. Finally, the log data compression and decompression system 100 writes the message variables from the log message and the message signature from the compression index that corresponds to the message template of the log message during step 330 to a log file.

Figure 4:
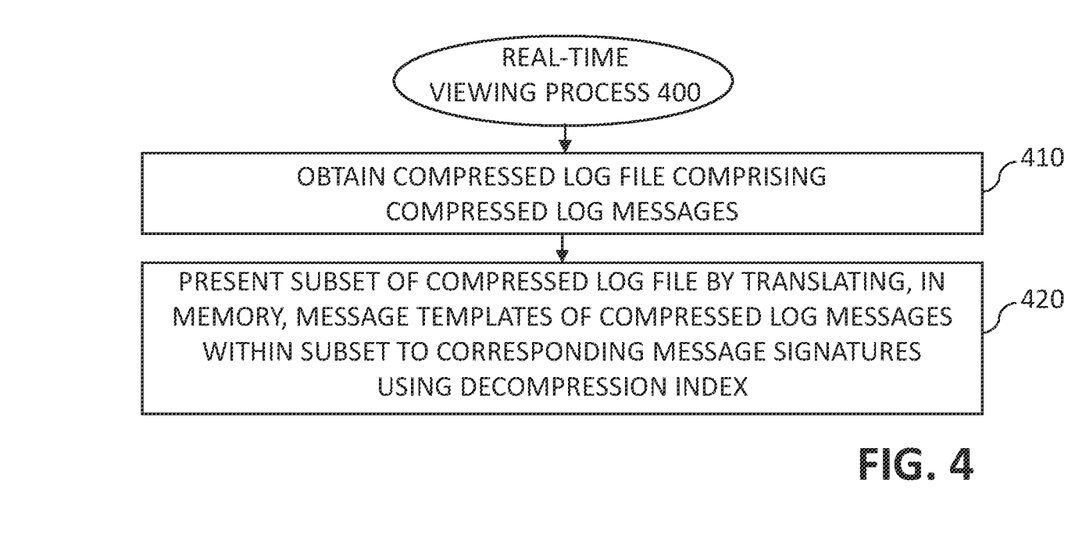
FIG. 4 is a flow chart illustrating a real-time viewing process, according to some embodiments.
Figure 8:
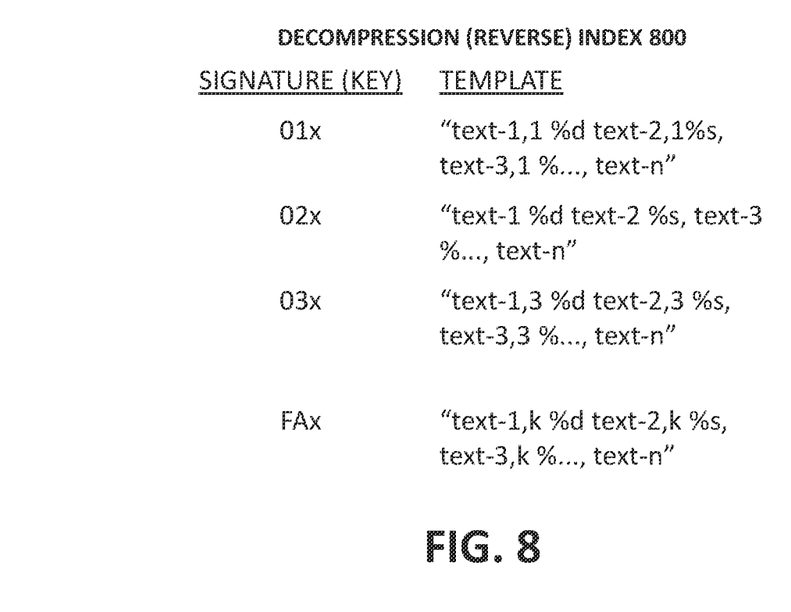
FIG. 8 is a table illustrating an exemplary decompression index that may be used by the exemplary real-time viewing process of FIG. 4, according to an embodiment.

FIG. 4 is a flow chart illustrating a real-time viewing process 400 of FIG. 1 in further detail, according to some embodiments. As shown in FIG. 4, the exemplary real-time viewing process 400 initially obtains a compressed log file comprising compressed log messages during step 410, and presents a subset of a compressed log file during step 420 by translating, in memory, one or more message signatures of compressed log messages within the subset to corresponding message templates using the decompression index 800 (FIG. 8).

The presented subset of the compressed log file may comprise, for example, a predefined number of lines surrounding a requested line of the compressed log file. In addition, in some embodiments, at least one additional subset (e.g., before and/or after the presented subset) of the compressed log file is precomputed by translating, in memory, the message signatures of the compressed log messages within the additional subset to corresponding message templates using the decompression index 800.

Figure 5:
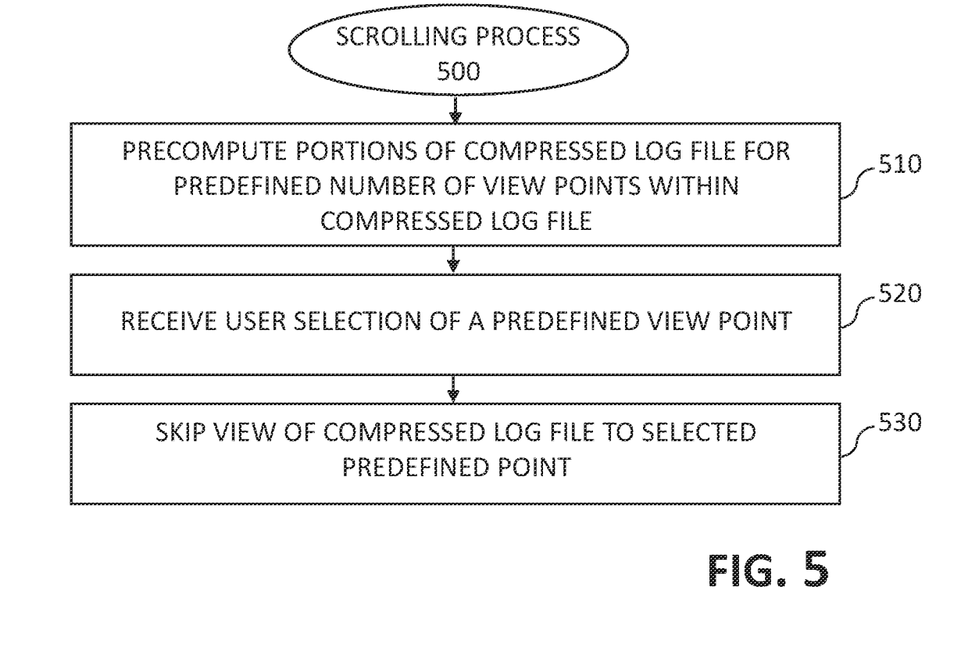
FIG. 5 is a flow chart illustrating an exemplary implementation of a scrolling process, according to one embodiment of the disclosure.

FIG. 5 is a flow chart illustrating an exemplary implementation of a scrolling process 500, according to one embodiment of the disclosure. As shown in FIG. 5, the exemplary scrolling process 500 precomputes portions of a compressed log file during step 510 for a predefined number of view points within the compressed log file. For example, the exemplary scrolling process 500 can calculate the different line numbers for a number of different points in the file (such as 100 view points), in advance, in order to support quick skips within the log file using scroll bar of the real-time viewing tool 400.

A user selection of a predefined view point is received during step 520, and the exemplary scrolling process 500 skips the view of the compressed log file during step 530 to the selected predefined view point.

FIG. 6 illustrates a presentation 600 of decompressed portions 620 of compressed log data 610, according to an embodiment of the disclosure. As shown in FIG. 6, a collection of compressed log data on disk 610 comprises a plurality of compressed log messages. Assume that a portion 640 of the compressed log data 610 has been selected for presentation to a user (e.g., in response to an explicit user request for the portion 640, or in response to a user search for the portion 640). As discussed herein, only a decompressed portion 650 (and, optionally, predefined additional portions before and/or after the requested decompressed portion 650), will be decompressed in memory. The corresponding decompressed log data 620 is shown in FIG. 6 for presentation, for example, on a viewer screen.

In one or more embodiments of the disclosure, the disclosed techniques for decompression of compressed log data supports a search capability over the compressed log data. Generally, a user can search for two kinds of tokens (e.g., strings). A user can search for strings that are a sub-string of the patterns or for a string that is not a sub-string of the patterns. When searching for strings that are a sub-string of the patterns, the disclosed real-time viewing tool 400 starts by searching the patterns first and mapping the signature of the patterns which include the searched string, and then extracting a predefined number of screens (e.g., the first 10 screens) that contain the relevant signatures.

When searching for strings that are not a sub-string of the patterns, part of all of the string should be a variable value (recall that the variables value are saved explicitly in the file in one or more embodiments), and the disclosed real-time viewing tool 400 looks for the variables and extracts the relevant screens containing those values.

In some embodiments, the number of extracted screens of search results can be limited (e.g., extract up to 10 screens of results) in order to keep the memory utilization low.

Figure 7:
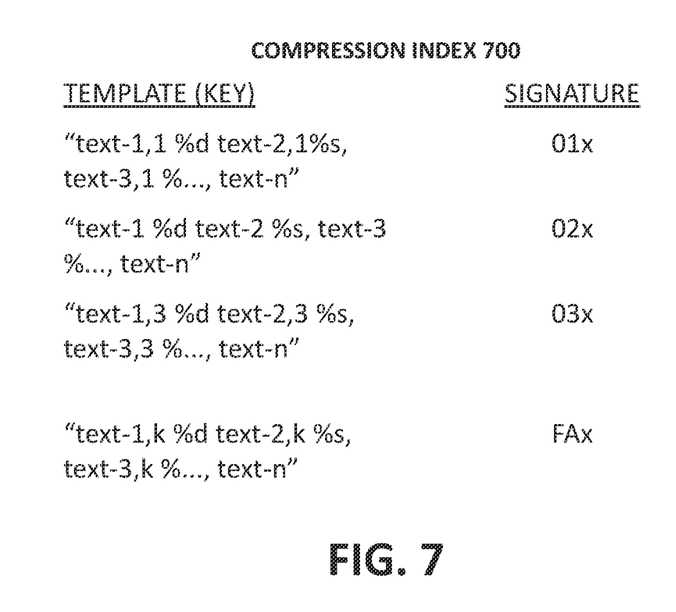
FIG. 7 is a table illustrating an exemplary compression index that may be used by the exemplary log message reduction process of FIG. 3, according to one embodiment.

FIG. 7 is a table illustrating an exemplary compression index 700 that may be used by the exemplary log message reduction process 300 of FIG. 3, according to one embodiment. As shown in FIG. 7, in the exemplary compression index 700, the keys correspond to message templates; and the values correspond to message signatures. For example, the exemplary compression index 700 maps the template "text-1,3% d text-2,3% s, text-3,3% . . . , text-n" to a signature of "03x".

FIG. 8 is a table illustrating an exemplary decompression index 800 that may be used by the exemplary real-time viewing process 400 of FIG. 4, according to an embodiment. As shown in FIG. 8, in the exemplary decompression index 800, the keys correspond to message signatures; and the values correspond to message templates (e.g., providing a reverse index). For example, the exemplary decompression index 800 (reverse index) maps the signature of "03x" back to a template of "text-1,3% d text-2,3% s, text-3,3% . . . , text-n."

Figure 9:
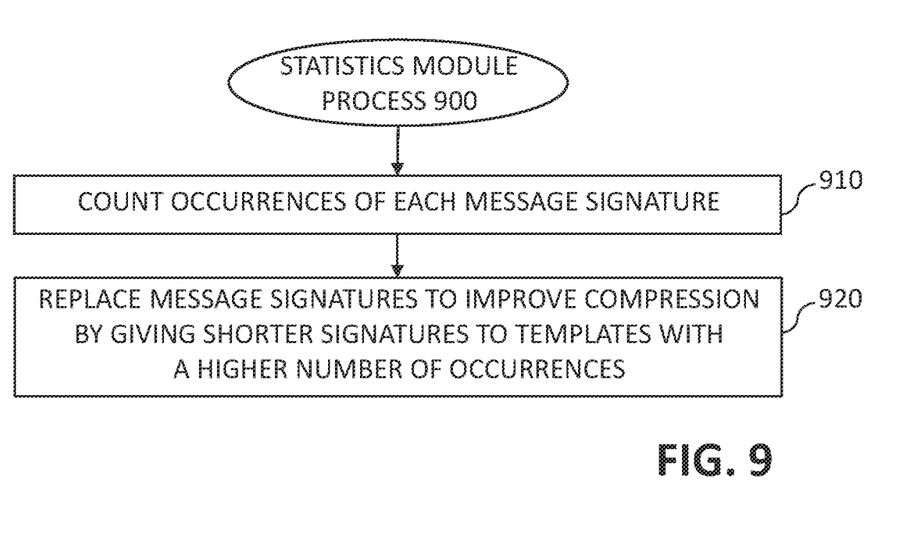
FIG. 9 is a flow chart illustrating a statistics module process, according to some embodiments.

FIG. 9 is a flow chart illustrating a statistics module process 900, according to some embodiments. Generally, the exemplary statistics module process 900 counts the occurrences of each message signature and according to the number of times each template has occurred across the log messages, relative to occurrences of other log templates, the exemplary statistics module process 900 will replace the message signatures to improve the compression by giving the template with a higher number of occurrences the signatures with the shorter lengths. The re-assignment can be done, for example, from time to time using offline process that will run on the background.

As shown in FIG. 9, the exemplary statistics module process 900 counts occurrences of each message signature during step 910 and replaces message signatures during step 920 to improve compression by giving shorter signatures to templates with a higher number of occurrences. In this manner, a given message signature is assigned to a particular message template based on a length of the given message signature and a frequency of occurrence of the particular message template.

Among other benefits, the disclosed log message reduction techniques parse a received log message into a message template and one or more message variables. The message variables from the log message and the message signature that corresponds to the message template of the log message in a compression index are written to a log file to store the log message in a compressed format.

In some embodiments, the disclosed techniques for real-time compression and viewing of log data significantly reduce storage requirements in terms of capacity and improve analysis over the log data by presenting only a first subset of the compressed log file by translating, in memory, the message signatures of the compressed log messages within the first subset to corresponding message templates using a decompression index that maps a plurality of the message signatures to corresponding message templates.

One or more embodiments of the disclosure provide improved methods, apparatus and computer program products for decompression of compressed log data. The foregoing applications and associated embodiments should be considered as illustrative only, and numerous other embodiments can be configured using the techniques disclosed herein, in a wide variety of different applications.

It should also be understood that the disclosed log message presentation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for decompression of compressed log data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a real-time viewing tool 400, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a log data compression platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
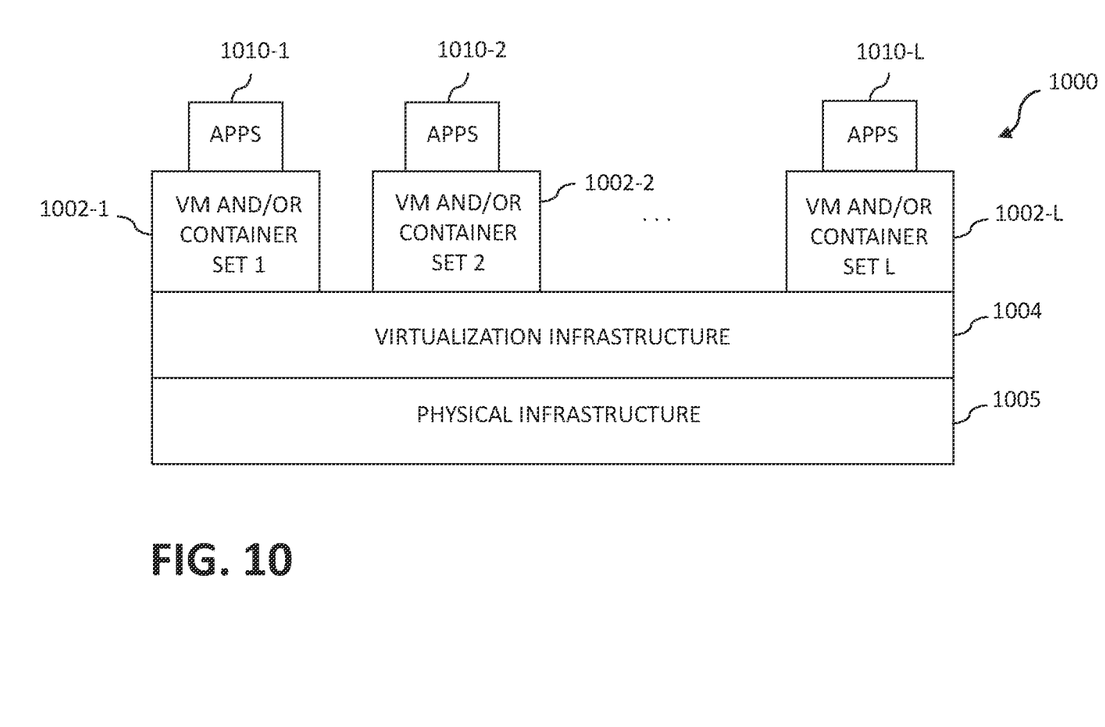
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the compression and decompression system 100. The cloud infrastructure 1000 comprises multiple virtual machines (VMs) and/or container sets 1002-1, 1002-2, ... 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, ... 1010-L running on respective ones of the VMs/container sets 1002-1, 1002-2, ... 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide functionality for decompression of compressed log data of the type described above for one or more processes running on a given one of the VMs. For example, each of the VMs can implement decompression of compressed log data functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide decompression of compressed log data functionality of the type described above for one or more processes running on different ones of the containers. For example, a container host device supporting multiple containers of one or more container sets can implement one or more instances of decompression of compressed log data logic for use in presenting compressed log data.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, ... 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
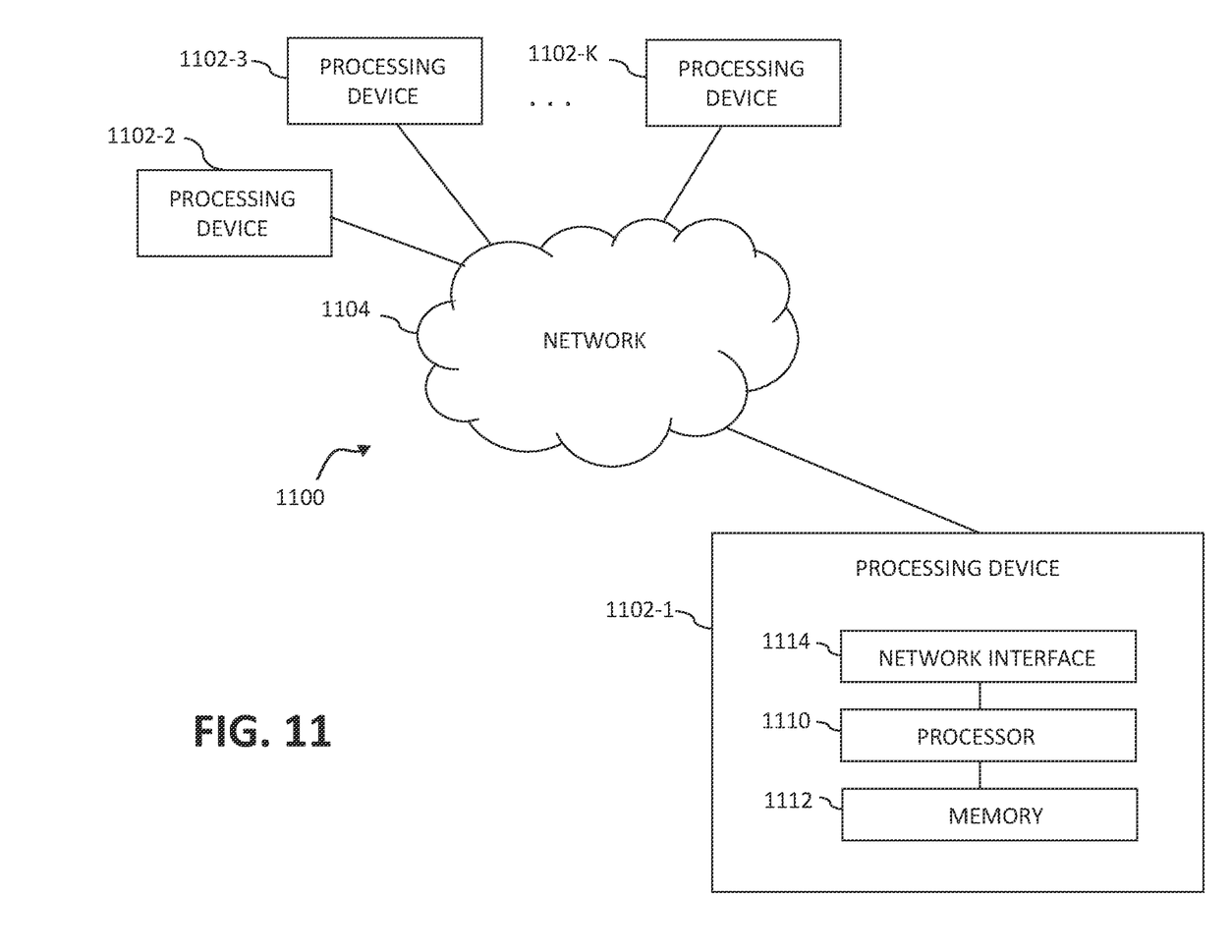
FIG. 11 illustrates another exemplary processing platform that may be used to implement at least a portion of one or more embodiments of the disclosure.

Multiple elements of system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a compressed log file comprised of a plurality of compressed log messages, wherein a given compressed log message is comprised of one or more message variables and a message signature corresponding to a message template of the given compressed log message; and
    presenting, using at least one processing device, a first subset of the compressed log file to a user by translating, in memory, the message signatures of the compressed log messages within said first subset to corresponding message templates to decompress the first subset of the compressed log file using a decompression index that maps a plurality of the message signatures to corresponding message templates, wherein the presenting step further comprises the step of precomputing at least one additional subset of the compressed log file by translating, in memory, the message signatures of the compressed log messages within said at least one additional subset to corresponding message templates using the decompression index, wherein said at least one additional subset comprises a predefined subset of the compressed log file one or more of before and after the first subset.

2. The method of claim 1, wherein the first subset of the compressed log file comprises a predefined number of lines one or more of before and after a requested line of the compressed log file.

3. The method of claim 1, wherein the at least one additional subset of the compressed log file comprises a predefined number of points within the compressed log file, wherein a user can skip a view of the compressed log file to one of the predefined number of points.

4. The method of claim 1, further comprising the steps of searching the compressed log file for one or more strings comprising a sub-string; searching the decompression index for one or more identified message templates comprising the sub-string; and searching the compressed log file for one or more message signatures for the one or more identified message templates.

5. The method of claim 1, further comprising the step of searching the compressed log file for one or more strings that are a sub-string of one of the message variables in the compressed log file.

6. The method of claim 1, wherein the decompression index comprises a key/value database where the message signatures are keys and the corresponding plurality of message templates are values of the key/value database.

7. The method of claim 1, wherein the message templates are not stored in the compressed log file.

8. A system, comprising:
a memory; and
at least one processing device, coupled to the memory, operative to implement the following steps:
obtaining a compressed log file comprised of a plurality of compressed log messages, wherein a given compressed log message is comprised of one or more message variables and a message signature corresponding to a message template of the given compressed log message; and
presenting, using at least one processing device, a first subset of the compressed log file to a user by translating, in memory, the message signatures of the compressed log messages within said first subset to corresponding message templates to decompress the first subset of the compressed log file using a decompression index that maps a plurality of the message signatures to corresponding message templates, wherein the presenting step further comprises the step of precomputing at least one additional subset of the compressed log file by translating, in memory, the message signatures of the compressed log messages within said at least one additional subset to corresponding message templates using the decompression index, wherein said at least one additional subset comprises a predefined subset of the compressed log file one or more of before and after the first subset.

9. The system of claim 8, wherein the first subset of the compressed log file comprises a predefined number of lines one or more of before and after a requested line of the compressed log file.

10. The system of claim 8, wherein the at least one additional subset of the compressed log file comprises a predefined number of points within the compressed log file, wherein a user can skip a view of the compressed log file to one of the predefined number of points.

11. The system of claim 8, further comprising the steps of searching the compressed log file for one or more strings comprising a sub-string; searching the decompression index for one or more identified message templates comprising the sub-string; and searching the compressed log file for one or more message signatures for the one or more identified message templates.

12. The system of claim 8, further comprising the step of searching the compressed log file for one or more strings that are a sub-string of one of the message variables in the compressed log file.

13. The system of claim 8, wherein the decompression index comprises a key/value database where the message signatures are keys and the corresponding plurality of message templates are values of the key/value database.

14. A computer program product, comprising a non-transitory machine-readable storage medium having encoded therein executable code of one or more software programs, wherein the one or more software programs when executed by at least one processing device perform the following steps:
obtaining a compressed log file comprised of a plurality of compressed log messages, wherein a given compressed log message is comprised of one or more message variables and a message signature corresponding to a message template of the given compressed log message; and
presenting, using at least one processing device, a first subset of the compressed log file to a user by translating, in memory, the message signatures of the compressed log messages within said first subset to corresponding message templates to decompress the first subset of the compressed log file using a decompression index that maps a plurality of the message signatures to corresponding message templates, wherein the presenting step further comprises the step of precomputing at least one additional subset of the compressed log file by translating, in memory, the message signatures of the compressed log messages within said at least one additional subset to corresponding message templates using the decompression index, wherein said at least one additional subset comprises a predefined subset of the compressed log file one or more of before and after the first subset.

15. The computer program product of claim 14, wherein the first subset of the compressed log file comprises a predefined number of lines one or more of before and after a requested line of the compressed log file.

16. The computer program product of claim 14, wherein the at least one additional subset of the compressed log file comprises a predefined number of points within the compressed log file, wherein a user can skip a view of the compressed log file to one of the predefined number of points.

17. The computer program product of claim 14, further comprising the steps of searching the compressed log file for one or more strings comprising a sub-string; searching the decompression index for one or more identified message templates comprising the sub-string; and searching the compressed log file for one or more message signatures for the one or more identified message templates.

18. The computer program product of claim 14, further comprising the step of searching the compressed log file for one or more strings that are a sub-string of one of the message variables in the compressed log file.

19. The computer program product of claim 14, wherein the decompression index comprises a key/value database where the message signatures are keys and the corresponding plurality of message templates are values of the key/value database.

20. The computer program product of claim 14, wherein the message templates are not stored in the compressed log file.

* * * * *